United States Patent
Moon

(10) Patent No.: US 7,462,417 B2
(45) Date of Patent: Dec. 9, 2008

(54) CONNECTING STRUCTURE FOR ELECTRICAL CONNECTION OF PCM AND BATTERY CELL AND SECONDARY BATTERY PACK CONTAINING THE SAME

(75) Inventor: Ki eob Moon, Seoul (KR)

(73) Assignee: LG Chem, Ltd. (KR)

( * ) Notice: Subject to any disclaimer, the term of this patent is extended or adjusted under 35 U.S.C. 154(b) by 544 days.

(21) Appl. No.: 11/152,948

(22) Filed: Jun. 15, 2005

(65) Prior Publication Data

US 2006/0019531 A1    Jan. 26, 2006

(30) Foreign Application Priority Data

Jul. 26, 2004  (KR) ..................... 10-2004-0058356

(51) Int. Cl.
*H01M 2/00* (2006.01)
*H01M 2/26* (2006.01)
*H01M 10/48* (2006.01)
*H01R 13/72* (2006.01)

(52) U.S. Cl. .............................. 429/90; 429/92; 429/93; 429/121; 429/170; 429/178; 439/501

(58) Field of Classification Search ................... 429/90, 429/92, 93, 121, 170, 178; 439/501
See application file for complete search history.

(56) References Cited

FOREIGN PATENT DOCUMENTS

KR    10-2005-0055580    *  6/2005

* cited by examiner

*Primary Examiner*—Patrick Ryan
*Assistant Examiner*—Angela Martin
(74) *Attorney, Agent, or Firm*—Cantor Colburn LLP

(57) ABSTRACT

An electrical connection structure, and a secondary battery pack using the same are disclosed. The structure comprises an electrical connection member which includes an insulating body for insulating a PCM from a battery cell, and cathode and anode leads mounted on the insulating body in a state of being electrically insulated from each other. One or both of the cathode and anode leads are welded to associated electrode terminals of the battery cell. The cathode and anode leads are connected in a contact state to associated electrode taps of the PCM when engaging the PCM to the battery cell. The connection structure allows only the electrode leads to be welded to the battery cell, and allows the electrode terminals to be connected to the electrode taps through contact without an additional welding operation, thereby remarkably reducing the number of assembling steps, lowering manufacturing costs and preventing malfunction.

10 Claims, 5 Drawing Sheets

CONNECTING STRUCTURE FOR ELECTRICAL CONNECTION OF PCM AND BATTERY CELL AND SECONDARY BATTERY PACK CONTAINING THE SAME

This application claims the benefit of the filing date of Korean Patent Application No. 10-2004-0058356, filed on Jul. 26, 2004, in the Korean Intellectual Property Office, the disclosure of which is incorporated herein in its entirety by reference.

FIELD OF THE INVENTION

The present invention relates to an electrical connection structure between a protective circuit module (PCM) and a battery cell, and a secondary battery pack comprising the same. More particularly, the present invention relates to an electrical connection structure for a protective circuit module and a battery cell, which comprises an electrical connection member having a particular structure including electrode leads for connecting electrode taps of a protective circuit module, which suppresses over-charge, over-discharge and over-current of the battery cell, to electrode terminals of the battery cell, so as to allow only the electrode leads of the electrical connection member to be welded to the battery cell and to allow the electrode terminals to be connected to the electrode taps by contact therebetween through engagement between the PCM and the battery cell, thereby remarkably reducing the number of steps in an assembly process, and a secondary battery pack comprising the same.

BACKGROUND OF THE INVENTION

Due to the development of mobile technology and the rapid increase in demand for mobile applications, demand for secondary batteries has also rapidly increased, and, in particular, lithium secondary batteries are now widely used as a power source for various electronic applications including mobile devices, due to its properties such as high energy density, high operating voltage, and excellent endurance and lifetime.

However, since the lithium secondary battery contains various flammable materials, there are disadvantages such as heat generation and explosion caused by over-charge, over-current and external physical impact, leading to instability of the battery. In order to prevent this problem, the lithium secondary battery has a protective circuit module (PCM), which is embedded therein and connected to the battery cell in order to effectively suppress abnormality of the battery such as over-charge.

The PCM comprises a field effect transistor acting as a switching device for controlling electric current, and various passive devices such as a voltage detector, a resistor, and a capacitor. The PCM suppresses over-charge, over-discharge and over-current of the battery, thereby preventing explosion or overheating of the battery, leakage of liquid, and deterioration in charging or discharging properties. In addition, the PCM suppresses reduction in electric properties, and physical and mechanical abnormality of the battery. As a result, the PCM acts to enhance the lifetime of the battery while eliminating dangers thereof.

In FIG. 1, an assembling method for electrically connecting the PCM to the battery cell in a conventional lithium secondary battery is illustrated.

Referring to FIG. 1, the battery cell 1 comprises a protruded anode (negative) or cathode (positive) terminal 1a (herein, an anode terminal is illustrated) formed on an upper end thereof, and an outer case constituting a cathode or anode terminal as an opposite electrode. The battery cell 1 further comprises two electrode leads 2 and 3 for electrical connection between the battery cell 1 and a PCM 4. The cathode lead 2 is welded to the upper end of the battery cell 1 and a cathode tap (not shown) provided at a lower end of the PCM 4, while the anode lead 3 is connected to the anode terminal 1a of the battery cell 1 and an anode tap (not shown) provided at the lower end of the PCM 4. In order to prevent electrical short from occurring by contact between other portions of the anode lead 3 connected to the anode tap and the PCM 4, an insulating paper 5 is interposed therebetween.

In this structure, several welding steps are required for ensuring electrical connection between the battery cell and the PCM. That is, it is necessary to weld the respective electrode leads 2 and 3 to the electrode terminals of the battery cell 1, and then to weld the electrode leads 2 and 3 to the electrode taps of the PCM 4. Furthermore, due to light weight and compactness of the secondary battery, components of the battery are further reduced in size, and thus welding of such small components requires skilled technique or precision equipment, thereby complicating the assembly process. As a result, lots of time is required for the assembly process, and the frequency of defective assembly is increased. Moreover, in order to weld the electrode leads 2 and 3 welded to the battery cell 1 to the electrode taps of the lower end of the PCM 4 again, a groove must be formed on a side surface of a battery cap (not shown) so as to provide an approach to the associated position from the side surface. However the groove is also used as an inlet of foreign substances (for example, water), causing malfunction or damage of the battery.

SUMMARY OF THE INVENTION

Therefore, the present invention has been made in view of the above problems, and it is an object of the present invention to provide an electrical connection structure, which allows reduction in the number of welding operations and components for electrically connecting a battery cell and a PCM, thereby reducing the number of steps for assembling a battery pack, and assembling time.

It is another object of the invention to provide a new electrical connection member, which is used for the above electrical connection structure.

It is yet another object of the invention to provide a secondary battery pack, which uses the electrical connection structure for electrical connection between the battery cell and the PCM to eliminate a side welding groove required for the conventional battery assembling process, thereby preventing malfunction or damage of the battery caused by foreign substances entering therethrough.

In accordance with one aspect of the present invention, the above and other objects can be accomplished by the provision of an electrical connection structure for electrically connecting a protective circuit module (PCM) and a battery cell, comprising: an electrical connection member used for electrically connecting the PCM and the battery cell, the electrical connection member including an insulating body for insulating the protective circuit module from the battery cell, and a cathode lead and an anode lead mounted on the insulating body in a state of being electrically insulated from each other, wherein one or both of the cathode lead and the anode lead are welded to associated electrode terminals of the battery cell, and wherein the cathode and anode leads are connected in a contact state to associated electrode taps of the PCM when engaging the PCM to the battery cell.

Accordingly, when assembling a battery pack using the electrical connection structure of the invention, since only welding is performed for attaching the electrode leads of the electrical connection member to the electrode terminals of the battery cell, and the electrical connection member is electrically connected to the PCM through physical contact therebetween, for example, by mechanical engagement therebetween, it is possible to remarkably reduce the number of welding operations, and to remove a side groove for welding the electrode leads to the electrode tap. Additionally, when using the electrical connection structure of the invention, since it is not necessary to provide additional members (for example, the insulating paper in the prior art) for insulating other portions except for the portions of the electrode terminals of the battery cell electrically connected to the electrode taps of the PCM, it is possible to remarkably reduce the number of assembling processes of the battery pack.

Preferably, the insulating body has a rectangular shape, and the cathode and anode leads are mounted on the insulating body to extend from both sides of the insulating body, and are spaced a predetermined distance from upper and lower ends of the insulating body on both sides of the insulating body, respectively. With such a structure, when the connection member is equipped between the battery cell and the PCM, the battery cell and the PCM can be electrically insulated via the insulating body, except for a predetermined portion of the electrode leads.

Preferably, in this structure, a portion of the cathode lead and/or the anode lead is bent down in a direction of the electrode terminal of the battery cell so as to easily contact an associated electrode terminal of the battery cell, and another portion thereof is bent upward in a direction of the electrode tap of the PCM so as to easily contact an associated electrode tap of the PCM. Accordingly, the electrode leads and the electrode terminals can be easily welded, and electrical connection therebetween can also be easily obtained.

Preferably, the insulating body is formed at the center thereof with a downwardly open aperture or through-hole, one (a) of the two electrode leads has a downwardly bent portion formed near the insulating body, and an upwardly bent portion formed at an outer end of the electrode lead, and the other (b) has an inner end extending to the downwardly open aperture or through-hole of the insulating body, and an upwardly bent portion formed at an outer end of the other electrode lead. With this structure, the downwardly bent outer end of the electrode lead (a) contacts an associated electrode terminal of the battery cell, and the inner end of the electrode lead (b) contacts another associated electrode terminal (for example, the protruded electrode terminal) of the battery cell through the downwardly open aperture or through-hole. Furthermore, the upwardly bent outer ends of the electrode leads are connected to associated electrode taps of the PCM, respectively.

Welding of the connection member to the electrode terminals of the battery cell may be performed to one or both of the electrode leads, and may be performed by means of, for example, laser welding, resistant welding, and the like. However, in some cases, the connection member may be joined to the electrode terminals of the battery cell by soldering, instead of welding, and it should be understood that these modifications do not depart from the scope of the invention.

Preferably, the upwardly bent portions of the two electrode leads contacting the electrode taps of the PCM are located at the outer ends of the two electrode leads, and the outer ends of the two electrode leads are bent inwardly in an arcuate shape so as to be brought into resilient contact with the electrode taps of the PCM. The electrode taps formed at a lower end of the PCM have downwardly perpendicular portions, so that the arcuately bent portions of the electrode leads can be resiliently brought into contact with the downwardly perpendicular portions of the electrode taps.

Furthermore, the perpendicular portions of the electrode taps have embossing structures protruded towards the electrode leads of the connection member, so that contact between the electrode taps and the electrode leads can be further resiliently performed.

In particular, as with the embodiments described above, when the outer ends of the electrode leads have arcuately bent structures, and/or when the perpendicular portions of the electrode taps have inwardly protruded embossing structures, there is an advantageous effect in that the PCM can be further stably mounted on the battery cell.

In the electrical connection structure of the invention, the electrode taps of the battery cell may be electrically connected to the electrode leads of the connection member through physical contact therebetween. The physical contact is secured through engagement between the PCM and the battery cell. The engagement of the PCM to the battery cell can be performed in various manners including particular mechanical engaging structures of the PCM, the battery cell or other members (for example, cap housing), bonding, welding, or soldering therebetween.

Preferably, the PCM has a structure formed through insert injection molding for a protective circuit substrate having a protective circuit formed thereon, and the electrode taps together with a cap housing for protecting outer surfaces of the protective circuit substrate and the electrode taps. In some cases, the insert injection molding may be performed in a state of including safety devices such as a PCT and the like. Detailed descriptions of the insert injection molded PCM are disclosed in Korean Patent Application Nos. 2003-88528, 2004-2625, and 2005-6886 of the applicant, which are incorporated herein by reference. Since the structure is formed through the insert injection molding for the cap housing with the protective circuit substrate embedded therein, the lower end of the cap housing is coupled to the battery cell, thereby allowing mechanical engagement therebetween to be performed.

As described above, the invention provides the new electrical connection member for the electrical connection structure. Detailed description thereof has been described above.

In accordance with another aspect of the invention, a secondary battery pack assembled using the electrical connection structure is provided. The secondary battery pack of the invention is manufactured by mounting the PCM to the battery cell having an electrode assembly of the cathode/separation membrane/anode through the electrical connection structure as described above.

The battery cell of the invention may be applied to any secondary battery cell capable of being charged and discharged, and preferably, protective paper is attached to an outer engaging surface between the battery cell and the PCM so as to intimately support the PCM to the battery cell in a transverse direction.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Preferred embodiments of the invention will now be described with reference to the drawings. It should be noted that the embodiments are disclosed for the purpose of illustration, and do not limit the scope of the invention.

Figure 1:
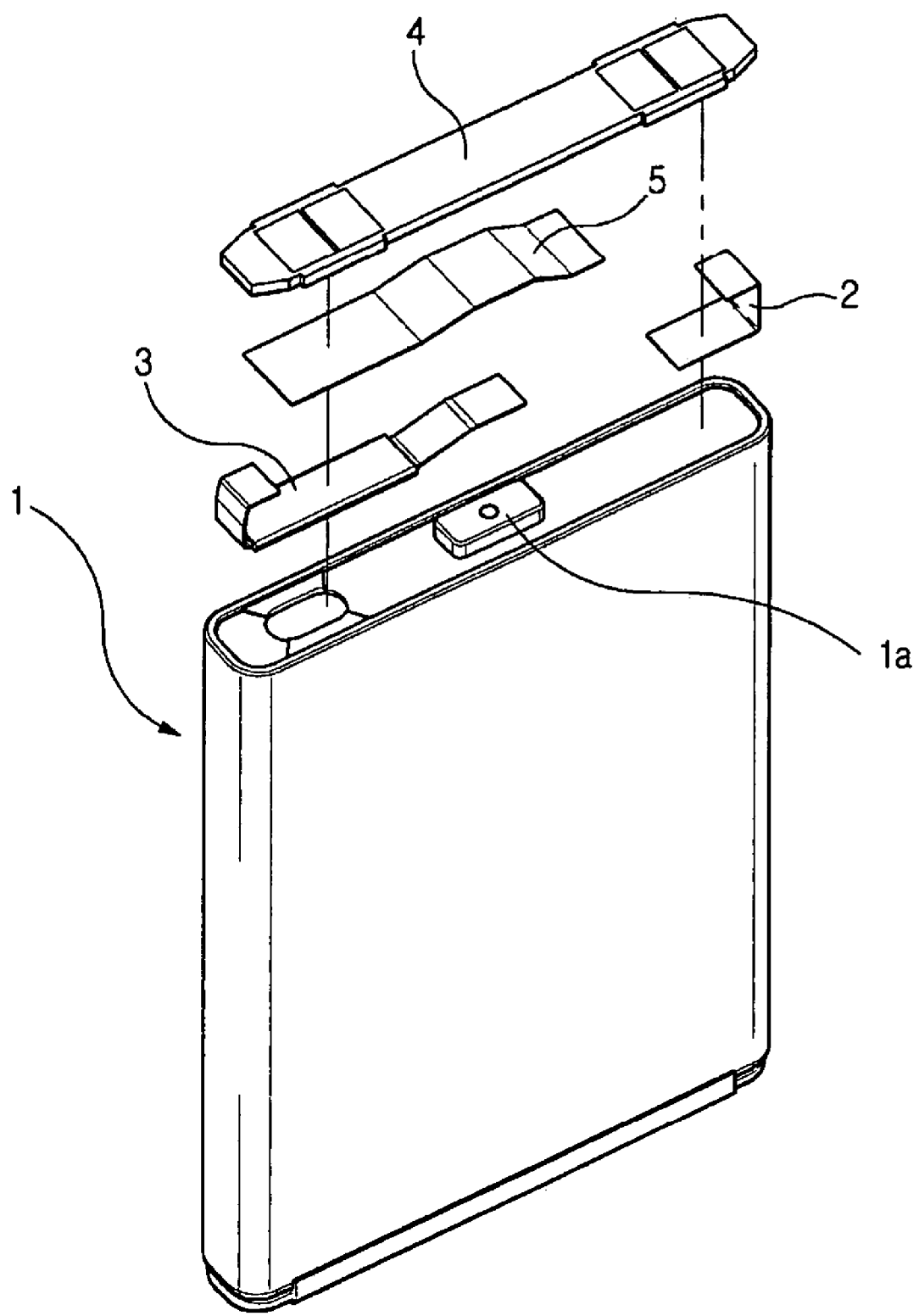
FIG. 1 is a perspective view illustrating an assembling method for electrically connecting a PCM to a battery cell in a conventional lithium secondary battery.
Figure 2:
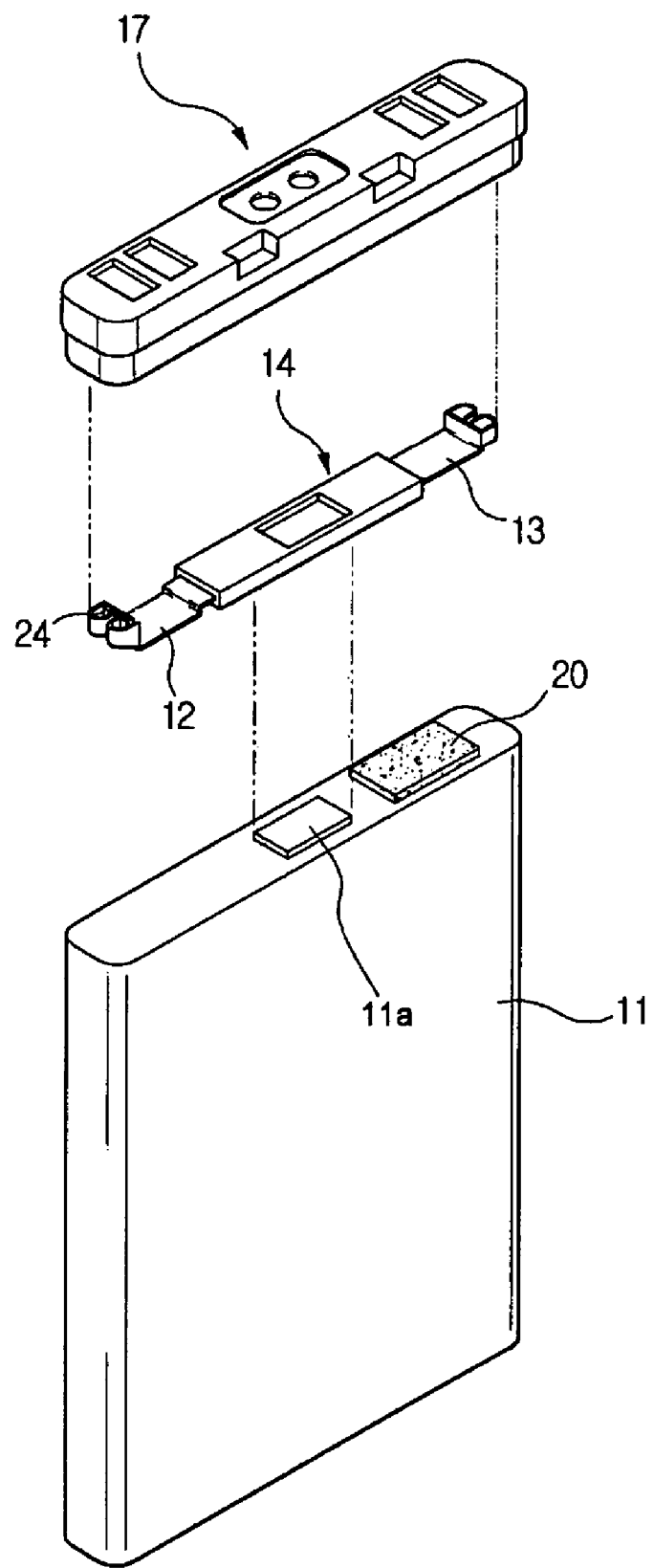
FIG. 2 is a perspective view illustrating a PCM connecting structure for a secondary battery in accordance with one embodiment of the present invention.

FIG. 2 is a perspective view illustrating a PCM connecting structure for a secondary battery in accordance with one embodiment of the present invention.

Referring to FIG. 2, a battery cell 11 comprises a protruded anode terminal 11a formed at the center on an upper end thereof, and an outer case constituting a cathode terminal.

An electrical connection member 14 for electrical connection between a PCM 17 and the battery cell 11 comprises a rectangular insulating body 14, a cathode lead 12 and an anode lead 13 respectively extending from both sides of the insulating body 14. Inner ends of the cathode lead 12 and the anode lead 13 are spaced from each other within the insulating body 14, so that the cathode lead 12 and the anode lead 13 are electrically insulated from each other.

The cathode lead 12 extends a predetermined distance from the insulating body 14, and is then bent downwardly. Accordingly, when the connection member 14 is mounted on the upper end of the battery cell 11, the downwardly bent portion of the cathode lead 12 is brought into contact with an upper end of the battery cell 11 (that is, the cathode terminal). Additionally, an outer end of the cathode lead 12 is bent inwardly in an arcuate shape. Thus, the outer end of the cathode lead 12 can be brought into resilient contact with a cathode tap (not shown) protruded from a lower end of the PCM 17.

The insulating body 14 is formed at the center with a through-hole at a position corresponding to the anode terminal 11a of the battery cell 11. Since the inner end of the anode lead 13 extends to the through-hole of the insulating body 14, it contacts the anode terminal 11a of the battery cell 11 with the connection member 14 mounted on the upper end of the battery cell 11. Meanwhile, unlike the cathode lead 12, the anode lead 13 is not formed with a downwardly bent portion. Instead, an insulating material 20 is attached to an associated upper end of the battery cell 11 in order to prevent electrical short from occurring when a portion except for the inner end of the anode lead contacts the upper end of the battery cell 11. Additionally, as with the cathode lead 12, an outer end of the cathode lead 13 has an acruately bent structure, so that the outer end of the cathode lead 13 can be brought into resilient contact with an anode tap (not shown) protruded from the lower end of the PCM 17.

The PCM 17 has an integral structure formed through insert injection molding for a cap housing with a protective circuit substrate (not shown) embedded therein. The electrode taps are insert injection molded together with the protective circuit substrate in a state of being connected thereto, and at this time, at least some portions of the electrode taps are exposed from the lower end of the PCM 17 such that the electrode taps are connected to the electrode leads 12 and 13 of the electrical connection member 14.

When the electrical connection member 14 is mounted on the upper end of the battery cell 11, the downwardly bent portion of the cathode lead 12 is brought into contact with the upper end of the battery cell 11, and the inner end of the anode lead 13 is brought into contact with the anode terminal 11a of the battery cell 11 via the through-hole of the insulating body 14. Thus, when one or both of these contact portions are welded to associated ones, the electrical connection member 14 is mounted on the battery cell 11 with the electrode leads 12 and 13 electrically connected to associated electrode terminals (that is, the cathode terminal of the upper surface of the battery cell and the protruded anode terminal 11a) of the battery cell 11. Then, when the PCM 17 is engaged with the battery cell 11 in such a manner of covering the electrical connection member 14, the electrode leads 12 and 13 of the electrical connection member 14 can be connected to the associated electrode taps of the PCM 17 without an additional welding operation.

Figure 3:
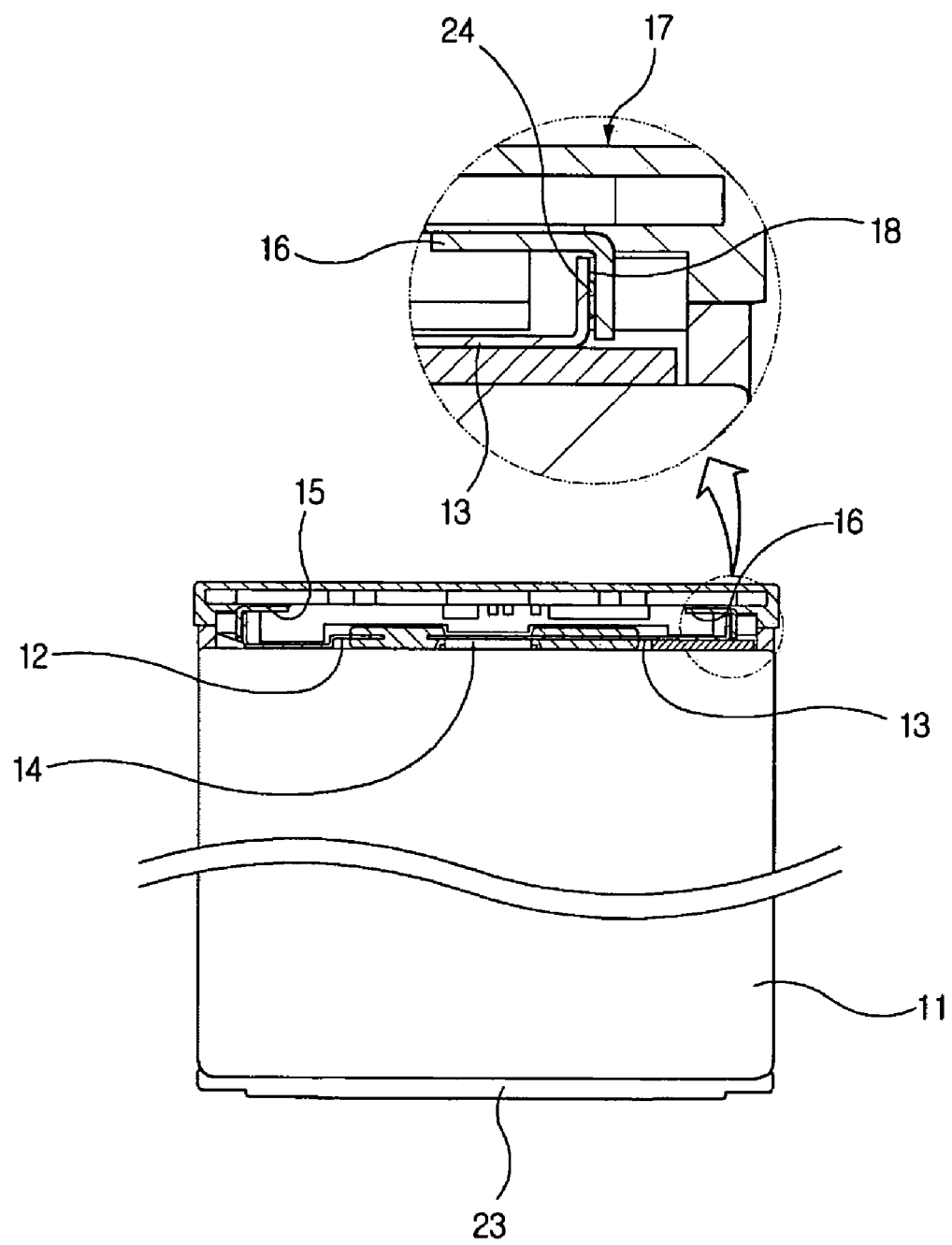
FIG. 3 is a vertical cross sectional view and a partially enlarged view thereof, illustrating a battery pack in accordance with one embodiment of the present invention in which an electrical connection member and a PCM are mounted on a battery cell.

FIG. 3 is a vertical cross sectional view and a partially enlarged view thereof, in which the electrical connection member and the PCM are mounted on the upper end of the battery cell.

Referring to FIG. 3, when the electrical connection member 14 and the PCM 17 are mounted on and assembled to the upper end of the battery cell 11, the cathode terminal 12 of the electrical connection member 14 is connected to the cathode tap 15 of the PCM 17, and the anode terminal 13 of the electrical connection member 14 is connected to the anode tap 16 of the PCM 17. For example, the anode tap 16 is bent to have a downwardly perpendicular portion 18 formed on one surface thereof in a state of being attached to the protective circuit substrate of the PCM 17. The upwardly bent portion (outer end) of the anode lead 13 of the electrical connection member 14 is brought into contact with the perpendicular portion 18 of the anode tap 16. In particular, the perpendicular portion 18 of the anode tap 16 has an inwardly protruded embossing structure 24, so that the perpendicular portion 18 of the anode tap 16 can be brought into resilient contact with the upwardly bent portion of the anode lead 13. The resilient contact therebetween provides an effect of enhancing engagement between the PCM 17 and the battery cell 11.

Figure 4:
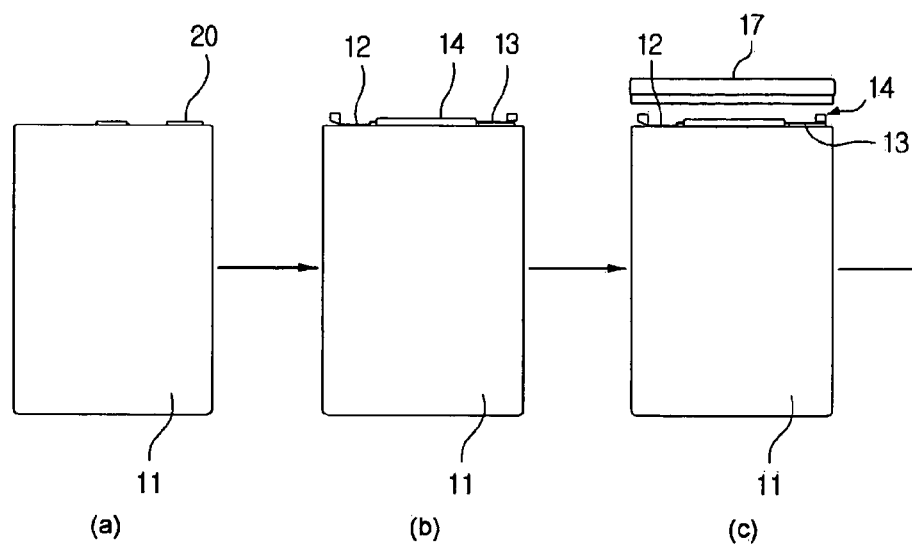
FIG. 4 is a flow diagram illustrating a process for assembling a secondary battery pack using the electrical connection structure in accordance with the present invention.
Figure 4:
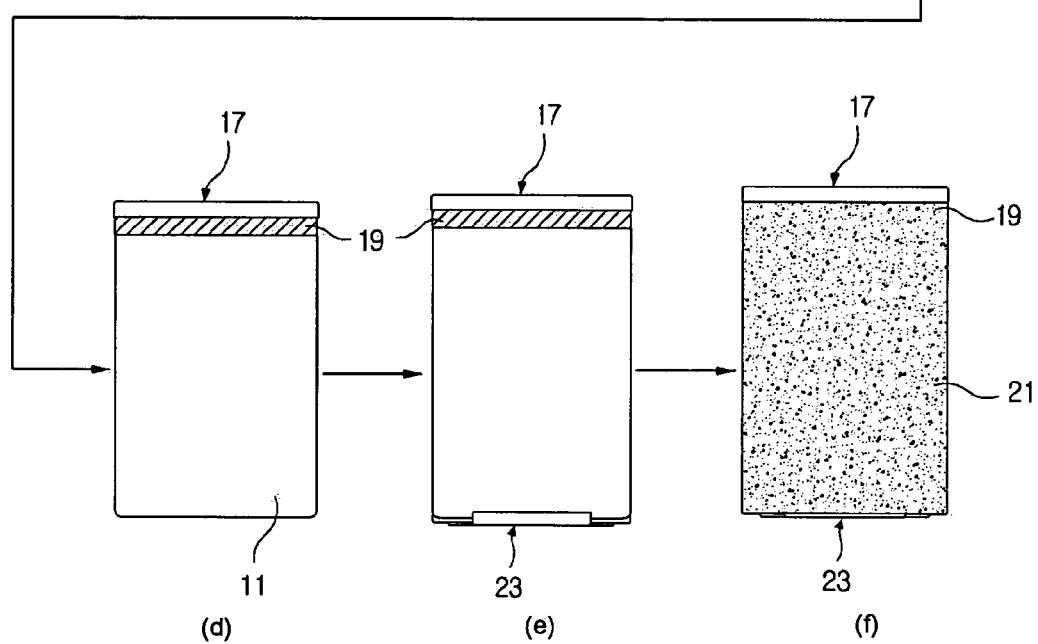
Figure 5:
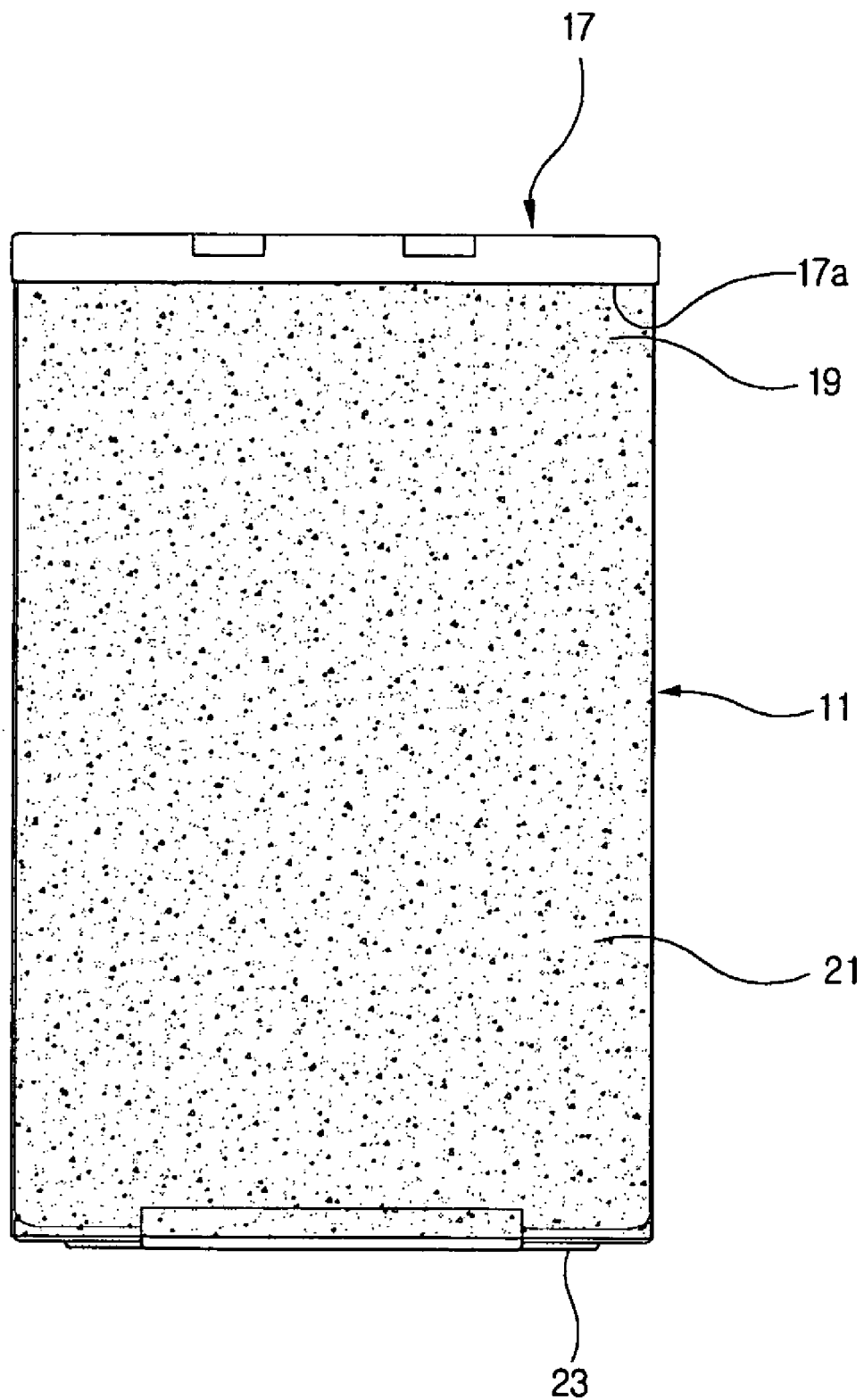
FIG. 5 is a diagram illustrating a battery pack in accordance with one embodiment of the present invention.

FIG. 4 is a flow diagram illustrating a process for assembling a secondary battery pack using the electrical connection structure of the invention, and FIG. 5 is a diagram illustrating a secondary battery pack assembled through the process.

Referring to these drawings, after attaching an insulating material 20 to an upper surface of the battery cell 11 (Step a), an electrical connection member 14 including a cathode lead 12 and an anode lead 13 is mounted on the upper surface of the battery cell 11, and contact portions between the cathode lead 12 and/or the anode lead 13 and the battery cell 11 are welded (Step b). Then, a PCM 17 is mounted on the battery cell 11 so as to cover the electrical connection member 14, and electrical connection therebetween is then obtained without an additional welding operation (Step c). During the mounting step, a lower latching jaw 17a of the PCM 17 surrounds an upper outer periphery of the battery cell 11, so that the PCM 17 is engaged with the battery cell 11, and the upper outer peripheral surface of the battery cell 11 including an outer surface of the latching jaw 17a of the PCM 17 is surrounded by a protective paper 19 made of a transparent Teflon material (Step d). Then, a lower cap 23 is bonded to a lower end of the battery cell 11 using a double-sided tape (not shown) (Step e), and a label 21 is attached to a lower outer peripheral surface of the battery cell 11 and the PCM 17 (Step f). The label 21 acts not only to enhance coupling force of the PCM 17 to the battery cell, but also to protect the battery cell 11. Additionally, the label 21 also acts as a medium for recording information about the battery or manufacturer thereof.

INDUSTRIAL APPLICABILITY

As apparent from the above description, when manufacturing a secondary battery pack using an electrical connection structure, the number of welding operations and components for electrical connection between a battery cell and PCM are reduced together with the number of steps and time for an assembling process of the battery pack, thereby lowering manufacturing costs and frequency of defective assembly. Additionally, the present invention does not require a side groove for welding operation which has been required in the prior art, thereby preventing malfunction or damage of the battery caused by foreign substances entering therethrough.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electrical connection structure for electrically connecting a protective circuit module (PCM) and a battery cell, comprising:
    an electrical connection member used for electrically connecting the PCM and the battery cell, the electrical connection member including an insulating body for insulating the protective circuit module from the battery cell, and a cathode lead and an anode lead mounted on the insulating body in a state of being electrically insulated from each other,
    wherein one or both of the cathode lead and the anode lead are welded to associated electrode terminals of the battery cell,
    wherein the cathode and anode leads are connected in a contact state to associated electrode taps of the PCM when engaging the PCM to the battery cell, and
    wherein the portions of the cathode and anode leads contacting the electrode taps of the PCM are located at the outer ends of the leads, and the outer ends of the leads are bent inwardly in an arcuate shape so as to be brought into resilient contact with the electrode taps of the PCM.

2. The electrical connection structure as set forth in claim 1, wherein the insulating body has a rectangular shape, and the cathode and anode leads are mounted on the insulating body to extend from both sides of the insulating body, and are spaced a predetermined distance from upper and lower ends of the insulating body on both sides of the insulating body, respectively.

3. The electrical connection structure as set forth in claim 2, wherein a portion of the cathode lead and/or the anode lead is bent downward in a direction of the electrode terminal of the battery cell so as to easily contact an associated electrode terminal of the battery cell, and another portion thereof is bent upward in a direction of the electrode tap of the PCM so as to easily contact an associated electrode tap of the PCM.

4. The electrical connection structure as set forth in claim 3, wherein the insulating body is formed at the center with a downwardly open aperture or through-hole, one of the two electrode leads has a downwardly bent portion formed near the insulating body, and an upwardly bent portion formed at an outer end of the electrode lead and contacting the electrode taps of the PCM, and the other has an inner end extending to the downwardly open aperture or through-hole of the insulating body, and an upwardly bent portion formed at an outer end of the other electrode lead.

5. The electrical connection structure as set forth in claim 1, wherein the electrode taps of the PCM comprise downwardly perpendicular portions, and embossing structures protruded towards the electrode leads of the connection member, respectively.

6. The electrical connection structure as set forth in claim 1, wherein engagement of the PCM to the battery cell is performed by particular mechanical engaging structures of the PCM, the battery cell or other members, bonding, welding, or soldering therebetween.

7. The electrical connection structure as set forth in claim 1, wherein the PCM has a structure formed through insert injection molding for a protective circuit substrate having a protective circuit formed thereon, and the electrode taps together with a cap housing for protecting outer surfaces of the protective circuit substrate and the electrode taps.

8. An electrical connection member for electrically connecting a PCM and a battery cell, comprising: a rectangular insulating body for insulating the PCM from the battery cell; and a cathode lead and an anode lead mounted on the rectangular body in a state of being insulated from each other, wherein the portions of the cathode and anode leads contacting associated electrode taps of the PCM are located at the outer ends of the leads, and the outer ends of the leads are bent inwardly in an arcuate shape so as to be brought into resilient contact with the electrode taps of the PCM.

9. A secondary battery pack assembled using the electrical connection structure according to any one of claim 1.

10. The secondary battery pack as set forth in claim 9, wherein a protective paper is attached to an outer engaging surface between the battery cell and the PCM so as to intimately support the PCM to the battery cell in a transverse direction.

* * * * *